June 25, 1957  D. F. CUNEO ET AL  2,796,814
BRACKET MEANS FOR MOUNTING PROMPTING MACHINES ON CAMERAS
Filed June 1, 1953  2 Sheets-Sheet 1
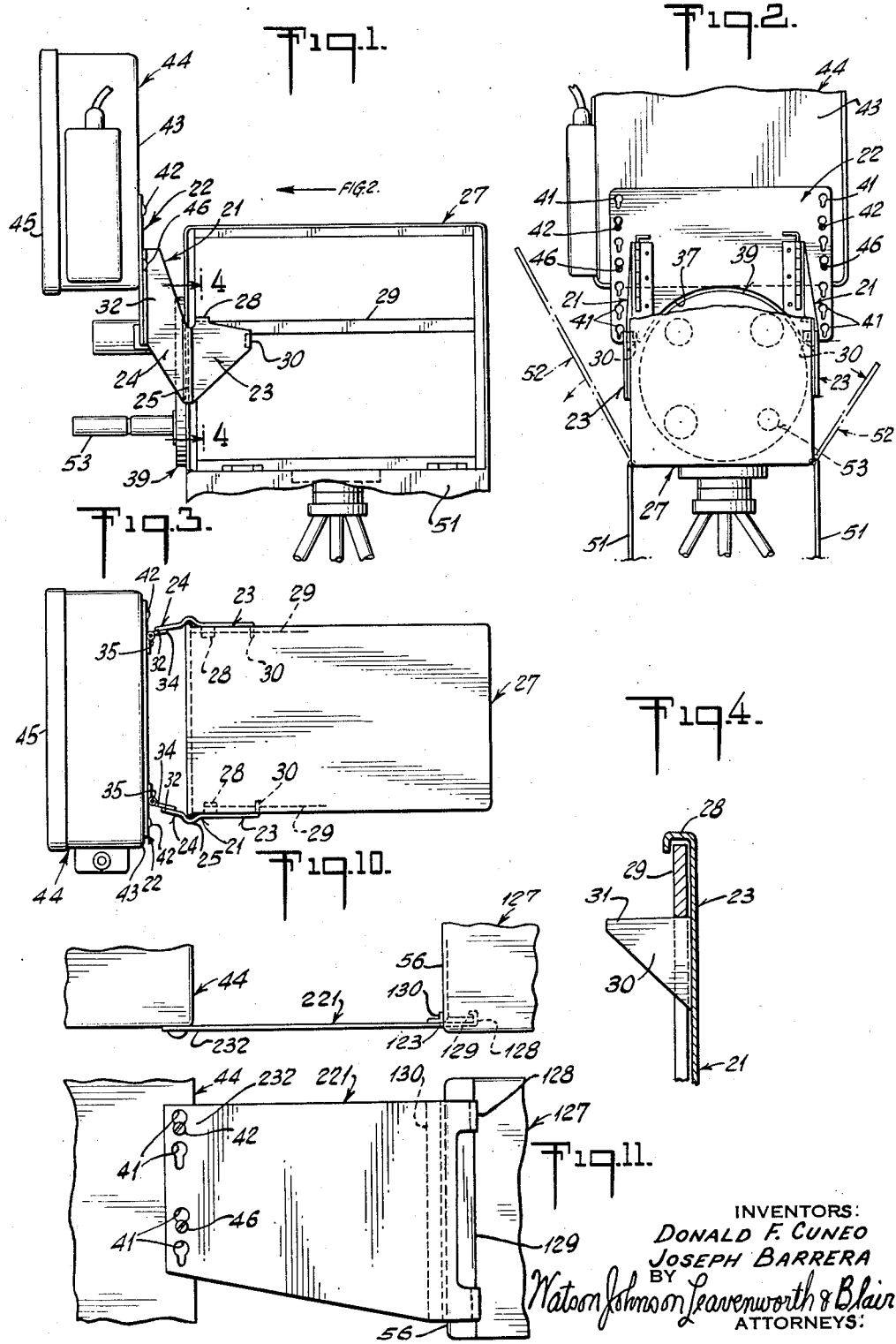
INVENTORS:
DONALD F. CUNEO
JOSEPH BARRERA
BY
Watson Johnson Leavenworth & Blair
ATTORNEYS

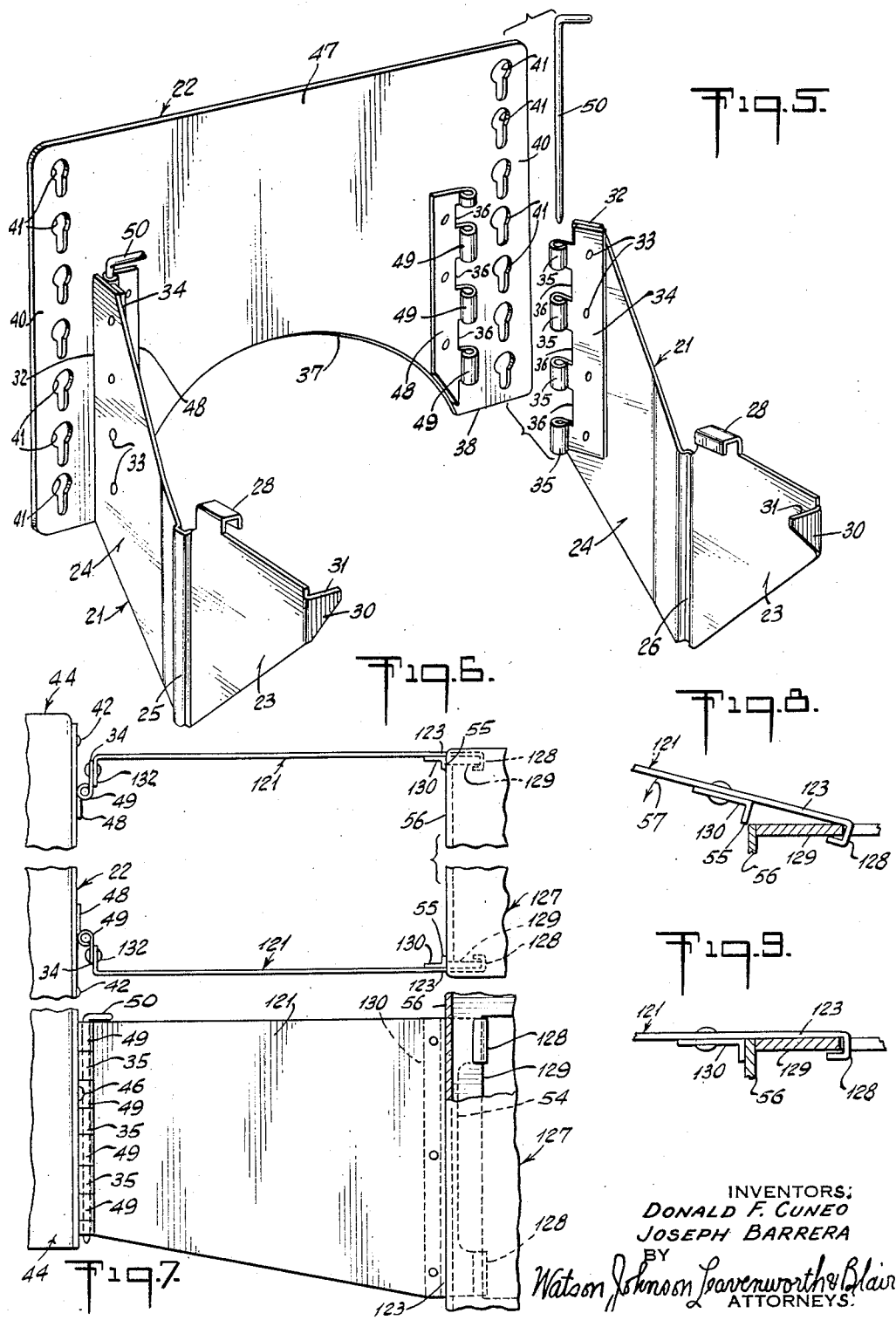

2,796,814
Patented June 25, 1957

United States Patent Office

2,796,814

BRACKET MEANS FOR MOUNTING PROMPTING MACHINES ON CAMERAS

Donald F. Cuneo and Joseph Barrera, Brooklyn, N. Y.

Application June 1, 1953, Serial No. 358,906

13 Claims. (Cl. 95—12)

The present invention relates to means for mounting prompting machines, such as the type disclosed in our copending application Serial No. 296,886, filed July 2, 1952, now abandoned, on cameras of various types, such as television and movie cameras.

A general object of the present invention is to provide such means in the form of readily and economically fabricated bracket devices which may be quickly and simply attached in a demountable manner on various types of cameras and to such prompting machines to support the latter on the fronts of the former above the lens means thereof, the bracket devices being easily adjustable in rapid manner to attain support of said prompting machines in a selected variety of different elevational positions.

A more specific object of the present invention is to provide such a bracket device which may be quickly hooked on the front of a camera and which is detachably engageable of a prompting machine in any one of a plurality of different positions of engagement to support the prompting machine above the camera lens equipment in any one of a plurality of predetermined different elevational positions, so as to permit the prompting device to be mounted as close as possible to the lens equipment of a variety of different types of cameras and different structural embodiments of the latter.

Further objects of the invention are the provision of structural embodiments of the device which are readily constructed and permit efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a side elevational view, with parts broken away, of an embodiment of the bracket device of the present invention and illustrating a prompting machine mounted on one type of camera thereby;

Fig. 2 is a back elevational view, with parts broken away, of the structure shown in Fig. 1, and illustrating by dot-dash lines intermediate positions of side doors of the camera as they are being swung down to expose camera frame structure at the sides for mounting engagement by the bracket device;

Fig. 3 is a top plan view of the structure shown in Fig. 1;

Fig. 4 is an enlarged detailed section, with parts in elevation, of the means employed in the Figs. 1 to 5 incl. embodiment for detachably connecting the bracket side arms to camera frame structure, and taken substantially along line 4—4 of Fig. 1;

Fig. 5 is an enlarged exploded perspective view of the bracket device embodiment illustrated in Figs. 1 to 4 incl.;

Fig. 6 is a top plan view with parts broken away, of a modified form of the bracket device of the present invention and illustrating use thereof in mounting a prompting machine on a different type of camera;

Fig. 7 is a side elevational view, with parts broken away and in section, of the structure shown in Fig. 6;

Fig. 8 is a sectional detail, with parts in elevation, of the modified form of connecting means employed in the Figs. 6 and 7 embodiment for connecting the bracket side arms to camera structure, and illustrating an intermediate mounting step;

Fig. 9 is a detailed view similar to Fig. 4, illustrating the relative positions of the parts shown in Fig. 8 after that mounting procedure has been completed;

Fig. 10 is a top plan view, with parts broken away, of still another embodiment of the present invention; and Fig. 11 is a side elevational view, with parts broken away, of the structure shown in Fig. 10.

Referring to the drawings, in which like numerals identify similar parts throughout, it will be seen from Figs. 1 to 5 incl. that an embodiment of the bracket device of the present invention may comprise a pair of laterally-spaced side arms 21, 21 and a transversely-disposed, upwardly-extending mounting plate 22. Each side arm 21 may comprise a rearwardly-extending generally lateral rear end portion 23 and a forwardly-extending, upwardly-sloped or obliqued front end portion 24. The portions 23 and 24 are preferably made integral from sheet metal stock, such as relatively rigid aluminum plate, and are preferably defined from each other by a vertical rib 25 defining on the inside thereof a vertical channel 26 which may receive upright front edge structure of a camera and, in any event, will tend to impart rigidity.

In the embodiment of the invention disclosed in Figs. 1 to 5 incl., means for quickly detachably mounting the side arms 21, 21 on a particular camera structure, such as that diagrammatically illustrated at 27, may comprise a pair of inwardly and downwardly extending hooks 28, 28, each preferably made integral with the top edge of the portion 23 and adapted to hook down over a horizontal frame element 29 of the camera. Rearwardly of the hook 28, the arm portion 23 carries an inwardly-extending abutment means or projection 30 which may be formed as the inturned end of the arm portion 23 when triangularly shaped as shown in Figs. 1 to 5 incl. As will be more fully understood from Fig. 4, the top edge 31 of the inturned projection 30 is adapted to be engaged beneath the lateral frame element 29 as the hook 28 is engaged over the top edge of the latter. Thus the hook element 28 supports the weight of the arm 21 and structure carried thereby with the frame element 29 at the hook element 28 serving as fulcrum means for the arm, while the projection 30 limits downward movement of the front end 32 of the arm under force of gravity so as to cause the front portion 24 of the arm to remain in a forwardly-projecting, upwardly-slanting position relative to the front of the camera, as is best seen in Fig. 1.

To the front end 32 of each of the side arms 21, 21 is mounted, in any suitable manner, such as by means of rivets 33—33, an upwardly-extending hinge leaf or strap 34 adapted in the mounted position to be disposed substantially vertically. The hinge leaf 34 is provided with a plurality of hinge pin or pintle receiving eyes or loops 35—35, such as four in number as illustrated in Fig. 5. The hinge eyes 35—35 of each hinge strap 34 are preferably spaced equidistant to provide slots 36—36 therebetween which are preferably receptive of similar hinge eyes of like dimension to permit obtainment of a feature of adjustment, hereinafter described.

As is best seen from Figs. 2 and 5, the mounting plate 22 is preferably substantially rectangular in shape, having a large arcuate notch 37 formed in the bottom edge 38 thereof to be receptive of the lens assembly or turret 39 of the camera 27. On the side marginal portions 40, 40 of the mounting plate 22 are provided detachable mounting means, preferably in the nature of a series of slots 41—41 which, in the preferred form, are keyhole slots through the enlarged portions of which are adapted to be received the enlarged heads of buttons or headed studs 42, 42. The pair of buttons 42, 42 preferably are mounted in laterally-spaced relation on the back side 43 of a prompting machine 44, from the front side 45 of which moving scrip can be viewed and read. The enlarged portions of any pair of keyholes 41, 41, of course, are receptive of the enlarged heads of the buttons 42, 42 and the smaller portions of the keyhole slots are receptive of the shanks of the buttons when the prompting machine 44 is supported by the mounting plate 22, as indicated in Fig. 2, with the button heads then anchoring the prompting machine to the mounting plate. If desired, an additional pair of buttons 46, 46 may be mounted on the back 43 of the prompting machine, each spaced from the button 42 on the same side a multiple of the spacing between the equally spaced keyhole slots 41—41. Thus, as indicated in Fig. 2, the studs or buttons 42—42 may be engaged in the second from the top slots 41—41 of the two rows thereof while the buttons 46, 46 are engaged in the fourth from the top slots in those two rows.

On the rear face 47 of the mounting plate 22 is mounted a pair of laterally-spaced hinge leaves or straps 48, 48 each complementary to one of the hinge straps 34, and thus carrying a series of spaced hinge eyes or loops 49—49 intervened by spaces 36—36 receptive of the eyes 35—35. It will thus be understood that a plurality of the eyes 35—35 of the hinge leaf 34 may be interchangeably received by a plurality of the spaces 36—36 intervening the eyes 49—49. For example, in the Fig. 5 showing, the top eye 35 and the next two eyes therebeneath of the hinge strap 34 are receivable in the three notches 36—36 of the hinge strap 48, and may be pivotally connected to the hinge eyes 49—49 by a removable hinge pin or pintle 50. The elevation of the mounting plate 22 relative to the side arms 21, 21 may be easily changed by removing the two pins 50, 50 and interdigitating certain others of the hinge eyes 35—35 with the hinge eyes 49—49. Thus, the keyhole slot button means for mounting the prompting machine 44 on the mounting plate 22 and also the hinges comprising straps 34 and 48 may alternatively or all together be employed for elevational adjustment of the prompting machine 44 relative to the camera 27.

In the type of camera illustrated in Figs. 1 and 2, the sides thereof are usually covered by hinged doors 51, 51 which are pivotally mounted along the bottom edges thereof so that when they are unlatched they may be swung down, such as is diagrammatically indicated by the dot-dash illustrations 52, 52 in Fig. 2. Thus, with the side doors 51, 51 depending, as indicated in full lines in Figs. 1 and 2, the sides of the camera are open to expose the framework thereof and, more particularly, the lateral frame elements or straps 29, 29 to which the bracket side arms are to be demountably hooked.

Thus, in operation of the embodiment of the bracket device of the present invention as illustrated in Figs. 1 to 5 incl., one may readily mount on the camera 27 the prompting machine 44 in a properly adjusted position in front of the camera and above the lens assembly 39, as closely adjacent to lens 53 which is in the operative position in Figs. 1 and 2, by the bracket device of the present invention comprising side arms 21, 21 and mounting plate 22. This may be accomplished by mounting the front end 32 of one side arm 21 on the mounting plate 22 by interfitting or interengaging the eyes 35—35 and 49—49 of one hinge and inserting its pintle 50 therethrough, such as is illustrated at the left side of Fig. 5. The projection 30 of this side arm 21 may then be inserted beneath the camera frame element 29 and that side arm then swung in to engage its hook 28 about or over this camera frame element. The remaining detached side arm 21, such as that illustrated at the right side of Fig. 5, may then be engaged with the like camera frame element 29 on the opposite side thereof and the hinge eyes 35—35 interengaged with the hinge eyes 49—49 of the remaining hinge after which its pintle 50 is inserted through the aligned sets of eyes, so as to support the mounting plate 22 in front of the camera 27 immediately adjacent and above its lens turret 39 and as close as possible to its operative lens 53.

The prompting machine 44 is then mounted upon the mounting plate 22 by insertion of the pairs of buttons 42, 42 and 46, 46 in selected pairs of the keyhole slots 41—41 which will support the prompting machine as a load on the arms 21, 21, with the bottom of the prompting machine located as closely adjacent to the operative lens 53 as possible without interfering with the beam of light receivable by the operative lens. Accordingly, an actor in front of the camera may be prompted by the scrip displayed in the front 45 of the prompting machine 44 while appearing in the picture taken to be looking into the camera.

Some common types of cameras are not characterized by frame structures having accessible, laterally-positioned frame elements over which the side arm hooks 28, 28 and beneath which the projections 30, 30 may be engaged. Many of those cameras, however, do have upwardly-extending or vertical frame elements which are accessible when the side doors are opened. As shown in Figs. 6 to 9 incl., the bracket device of the present invention may be readily adapted to the mounting of the prompting machine 44 upon such camera structure 127 by means of the mounting plate 22 with the use of modified forms of the side arms 121, 121.

As illustrated in Figs. 6 and 7, each side arm 121 may be a relatively flat plate having an inturned front end 132 carrying one of the hinge straps 34 which supports the complementary hinge strap 48 in the manner described above, and with the hinge straps 48, 48 in turn supporting the mounting plate 22. The edge of the back end 123 of each plate 121 may be cut away intermediate the corners thereof, as is indicated in dotted lines at 54 in Fig. 7, so as to provide two corner projections, each of which is bent inwardly and reversely to form a pair of forwardly-projecting hooks 128, 128 engageable about or behind an upright or vertical frame element or strap 129 of the camera 127 with the frame element or strap serving as fulcrum means. Each side arm 121 carries abutment means engageable of camera structure to limit downward movement of the front end 132. Such abutment means may be in the nature of an angle 130 extending across the back end 123 of the side arm 121 and fastened in any suitable manner, such as by riveting, to the inner face thereof so as to dispose one of its flanges 55 in front of upright camera structure, such as the front plate or panel 56 of its casing.

The bracket device of the present invention illustrated in Figs. 6 to 9 incl. is mounted in a manner similar to the mounting of the form of the device illustrated in Figs. 1 to 5 incl. For example, one of the side arms 121 may be hingedly connected to the mounting plate 22 with the other side arm dismounted therefrom. The hooks 128, 128 of the attached side arm will then be hooked in behind the rear edge of the camera frame strap 129, as indicated in Fig. 8, and that side arm 121 then swung inwardly in the direction of the arrow 57 to swing the abutment flange 55 over in front of the camera casing panel 56. The detached arm 121 is then mounted in similar fashion on the opposite side of the camera 127 and its hinge leaf is then brought to pintle connection with the complementary hinge leaf on the mounting plate 22. In this manner the side arms 121, 121 and the mounting plate 22 are demountably secured to the camera frame structure in a relatively simple manner so as to support in front of the camera 127 the prompting machine 44.

A simplified form of the bracket device of the present invention may be employed to mount the prompting machine 44 on the camera 127 as illustrated in Figs. 10 and 11. The back end 123 of each side arm 221 thereof may be provided with similar hooks 128, 128 to be engaged behind the frame strap or element 129, with a similar angle 130 serving as an abutment. The front end 232 of each side arm 221 may be extended forward substantially in the same plane of the remaining portion of the side arm and lapped against the side of the prompting machine 44, as illustrated in Figs. 10 and 11. The marginal portion of the front end 232 of each side arm 221 may be equipped with any suitable detachable mounting means for disconnectably engaging the prompting machine 44. For this purpose a plurality of keyhole slots 41—41 may be formed therein with a pair thereof adapted to receive buttons or headed studs 42 and 46 mounted on and extending from the side of the prompting machine.

In the use of the device illustrated in Figs. 10 and 11 one side arm 221 may be buttoned to one side of the prompting machine 44 by engaging the buttons 42 and 46 in a pair of the slots 41—41. The prompting machine 44 and the side arm 221 carried thereby may then be engaged with the frame element 129 and the front panel 56 of the casing of the camera 127 as in the manner taught in Figs. 8 and 9. The other side arm 221 is then engaged with the camera structure in similar fashion and buttons on the other side of the prompting machine are received in keyhole slots of the second side arm. This is readily attainable by virtue of the fact that the side arms 221, 221 are made of metal plate having some resiliency as to permit any small distortion which may be necessary to such mounting procedure.

Of course, the side plates 221, 221, of the Figs. 10 and 11 embodiment may be bent in suitable fashion to adapt them to any particular set-up wherein the prompting machine 44 is of a width different than the width of the camera 127. Further, the side arms of that embodiment may be equipped with hook and abutment structure of the Figs. 1 to 5 incl. embodiment, in lieu of the hooks 128, 128 and abutment angles 130, 130, if it is desired to adapt the mounting of Figs. 10 and 11 to a camera of the type illustrated at 27.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A bracket device for demountably mounting a prompting machine on the front of a camera comprising, in combination; a pair of laterally-spaced bracket side arms; hook means on one end of each of said arms removably to connect said side arms to portions of camera frame structure with the other ends of said arms extending forward as load-supporting elements, said hook means being adapted removably to hook about relatively fixed elements of opposite sides of the camera frame structure with the latter elements serving as bracket arm fulcrum means, said hook means comprising an inwardly and downwardly extending hook on each arm to hook down over a lateral camera frame structure element; abutment means on said bracket arms to be engaged against camera structure to limit downward movement of the other front ends of said arms about such camera frame fulcrum means, said abutment means comprising a rearwardly-extending extension of each of said arms behind each of said hooks having an inturned end to engage beneath the lateral frame element over which the hook on that arm engages, whereby said arms will be held in forwardly-extending positions to opposite sides of lens means of the camera; a transversely-disposed, upwardly-extending mounting plate supported by the front ends of said arms; and means detachably to support a prompting machine on said mounting plate in front of the camera above the lens means in any selected one of a plurality of different elevational positions.

2. The bracket device as defined in claim 1 characterized by a pair of laterally-articulatable hinges, one in each arm.

3. The bracket device as defined in claim 2 characterized by each hinge comprising a pair of upwardly-extending rows of interdigitated eyes interengageable in a plurality of different relative elevational positions, and a removable pintle holding said pair of rows of hinge eyes of each hinge in connected relation at a selected relative elevational position.

4. The bracket device as defined in claim 3 characterized by said supporting means as comprising a pair of upwardly-extending series of slots in said mounting plate with one series located in each side marginal portion of said plate receptive of at least one projection on the back of the prompting machine, whereby a pair of the projections laterally-spaced on the prompting machine may be engaged in like slots of the two series to support said prompting machine in selected elevational position for additional elevational adjustments.

5. A bracket device for demountably mounting a prompting machine on the front of a camera comprising, in combination; a pair of laterally-spaced bracket side arms; hook means on one end of each of said arms removably to connect said side arms to portions of camera frame structure with the other ends of said arms extending forward as load-supporting elements, said hook means being adapted removably to hook about relatively fixed elements of opposite sides of the camera frame structure with the latter elements serving as bracket arm fulcrum means, said hook means comprising an inwardly and forwardly extending hook on each arm to hook in behind an upright camera frame structure element; abutment means on said bracket arms to be engaged against camera structure to limit downward movement of the other front ends of said arms about such camera frame fulcrum means, said abutment means comprising an inwardly-extending projection on each arm ahead of the hook thereon and adapted to engage in front of upwardly-extending camera structure, whereby said arms will be held in forwardly-extending positions to opposite sides of lens means of the camera; a transversely-disposed, upwardly-extending mounting plate supported by the front ends of said arms; and means detachably to support a prompting machine on said mounting plate in front of the camera above the lens means in any selected one of a plurality of different elevational positions.

6. The bracket device as defined in claim 5 characterized by a pair of laterally-articulatable hinges, one in each arm.

7. The bracket device as defined in claim 6 characterized by each hinge comprising a pair of upwardly-extending rows of interdigitated eyes interengageable in a plurality of different relative elevational positions, and a removable pintle holding said pairs of rows of hinge eyes of each hinge in connected relation at a selected relative elevational position.

8. The bracket device as defined in claim 7 characterized by said supporting means as comprising a pair of upwardly-extending series of slots in said mounting plate with one series located in each side marginal portion of said plate receptive of at least one projection on the back of the prompting machine, whereby a pair of the projections laterally-spaced on the prompting machine may be engaged in like slots of the two series to support said prompting machine in selected elevational position for additional elevational adjustment.

9. The combination of a camera unit equipped with lens means, a prompting machine structure and a bracket device for demountably mounting said prompting machine structure to the front of the camera unit adjacent said lens means comprising a pair of laterally-spaced bracket side arms having rear portions mounted on said camera unit and forward portions extending forward to opposite sides of said lens means; and prompting machine supporting structure on the forward portions of said side arms detachably connected to and supporting at laterally-spaced locations said prompting machine structure; one of said prompting machine and its supporting structures having two laterally-spaced, upwardly-extending series of engaging means and the other of said structures having laterally-spaced, cooperating attaching means demountably connected to certain of said engaging means in the two series thereof, thereby supporting said prompting machine structure closely adjacent to said lens means, said attaching means being selectively demountably connectable to certain other of said engaging means in the two series thereof to permit selective adjustment of the position of said prompting machine structure relative to said lens means.

10. The combination defined in claim 9 characterized by said prompting machine supporting structure as being provided with the two series of engaging means in the form of two laterally-spaced, upwardly-extending series of slots; said attaching means comprising at least one pair of laterally-spaced projections on said prompting machine structure each removably engaged in a selected one of said slots in one series thereof demountably supporting said prompting machine structure on said side arms, whereby one of said projections is demountably engaged in a slot of one series thereof and the other of said projections is demountably engaged in the equivalent slot of the other series thereof with said projections being so engageable selectively in any selected pair of said slots in the two series thereof for adjustment of the position of said prompting machine structure relative to said lens means.

11. The combination as defined in claim 10 characterized by said slots being in the form of keyhole slots and said projections being in the form of buttons to be hooked thereinto.

12. The combination defined in claim 9 characterized by said prompting machine supporting structure and said engaging and attaching means as comprising a pair of laterally-spaced hinges with each supported by one of said side arms, each hinge comprising a plurality of interdigitated hinge pin-receiving eyes removably interfitted in a plurality of different axial positions to permit additional elevational adjustment of said prompting machine, and a pair of hinge pins each removably received in the interdigitated eyes of one of said hinges.

13. A bracket device for demountably mounting a prompting machine on the front of a camera comprising, in combination; a pair of laterally-spaced bracket side arms; hook means on one end of each of said arms removably to connect said side arms to portions of camera frame structure with the other ends of said arms extending forward as load-supporting elements, said hook means being adapted removably to hook about relatively fixed elements on opposite sides of the camera frame structure with the latter elements serving as bracket arm fulcrum means; abutment means on said bracket arms to be engaged against camera structure to limit downward movement of the other front ends of said arms about such camera frame fulcrum means, whereby said arms will be held in forwardly-extending positions to opposite sides of lens means of the camera; a transversely-disposed, upwardly-extending mounting plate supported by the front ends of said arms; and a pair of upwardly-extending series of slots in said mounting plate with one series located in each side marginal portion of said plate receptive of at least one projection on the back of the prompting machine, whereby a pair of the projections laterally-spaced on the prompting machine may be engaged in like slots of the two series to support said prompting machine in front of the camera above the lens means in a selected one of a plurality of different elevational positions.

References Cited in the file of this patent

UNITED STATES PATENTS

| | | |
|---|---|---|
| 2,157,154 | Tweed | May 9, 1939 |
| 2,209,057 | Jackson | July 23, 1940 |
| 2,598,947 | Thielen | June 3, 1952 |